Nov. 15, 1966 L. DIETCH 3,286,122

AUTOMATIC DEGAUSSING CIRCUIT

Filed Aug. 31, 1964

Inventor
Leonard Dietch
By Nicholas A. Camasto
Atty.

United States Patent Office 3,286,122

Patented Nov. 15, 1966

3,286,122

AUTOMATIC DEGAUSSING CIRCUIT

Leonard Dietch, Skokie, Ill., assignor to Admiral Corporation, Chicago, Ill., a corporation of Delaware

Filed Aug. 31, 1964, Ser. No. 393,250

4 Claims. (Cl. 315—8)

Figure 1:
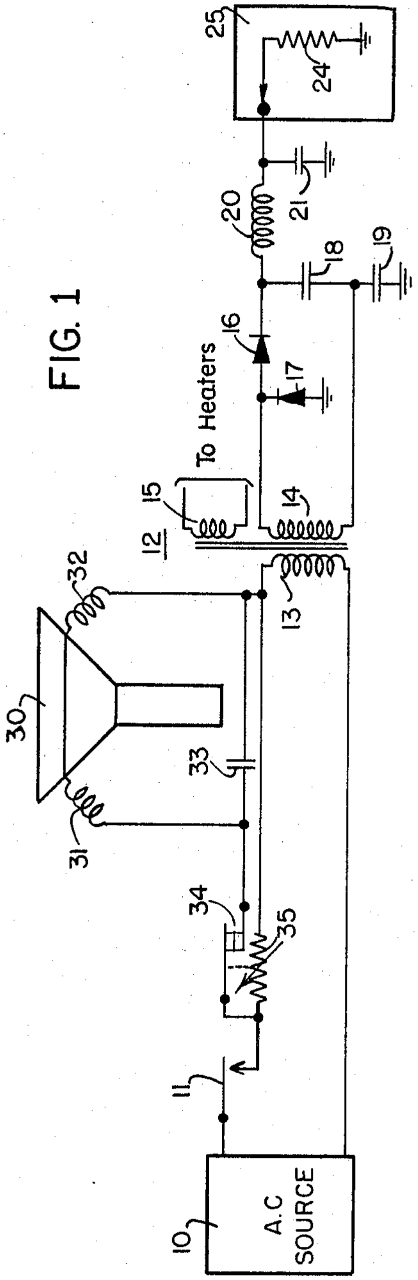

This invention relates in general to color television receivers and in particular to color television receivers having picture tubes which are susceptible to the influence of magnetic fields. More specifically, the invention is concerned with providing means for automatically demagnetizing or "degaussing" the picture tube of a color television receiver during the normal course of receiver operation.

In a conventional three-gun shadow mask type of color picture tube, the shadow mask is constructed of a permeable material which is susceptible to magnetic influence. Additionally, the tube is usually provided with an external magnetic shield as well as the receiver chassis, both of which are influenced by magnetic fields. In particular, the shadow mask shield and chassis are susceptible to the earth's magnetic field and steps must be taken to compensate for such field when installing the receiver. Normally, this is a service operation in which a serviceman subjects the set to a decreasing alternating flux field with the receiver positioned in its operating environment. This procedure has been necessary in order to assure proper beam landings in the tri-gun color tube.

The theory and art of demagnetization are well known and we need only be concerned here with the criteria. These are that the initial field be strong enough to fully overcome any previous magnetization and that it be progressively reduced to zero in a cyclical manner.

Once the set has been demagnetized or degaussed, it should be maintained in the same relative position with respect to the earth's magnetic field. Further, the influence of stray magnetic fields, such as that produced by small electric motors may upset the magnetic condition of the picture tube and shielding and require further demagnetization. This represents one of the major disadvantages of conventional color television receivers—the requirement that they remain in a relatively fixed position. Substantial movement of the receiver will generally necessitate further demagnetization.

The invention provides means for automatically degaussing the color television receiver picture tube and proximately located shielding elements each time the receiver is turned on from a substantially "cold start." This is accomplished by providing a pair of degaussing coils arranged circumferentially about the picture tube and supplying these coils with a tapered high amplitude alternating current for demagnetization. The term "taper" will be understood to connote a decay characteristic which may be linear, exponential, etc.

Accordingly, the primary object of this invention is to provide means for automatically demagnetizing the picture tube of a color television receiver.

Another object of this invention is to provide means for automatically demagnetizing the picture tube in a color television receiver, which means are operable each time the television set is operated.

A further object of this invention is to provide means for tapering the current fed to the demagnetizing coils to provide the demagnetizing action.

A feature of this invention resides in the provision of a capacitor which is connected across the magnetizing coils for "cyclically" dissipating any residual energy in the coils.

Figure 2:
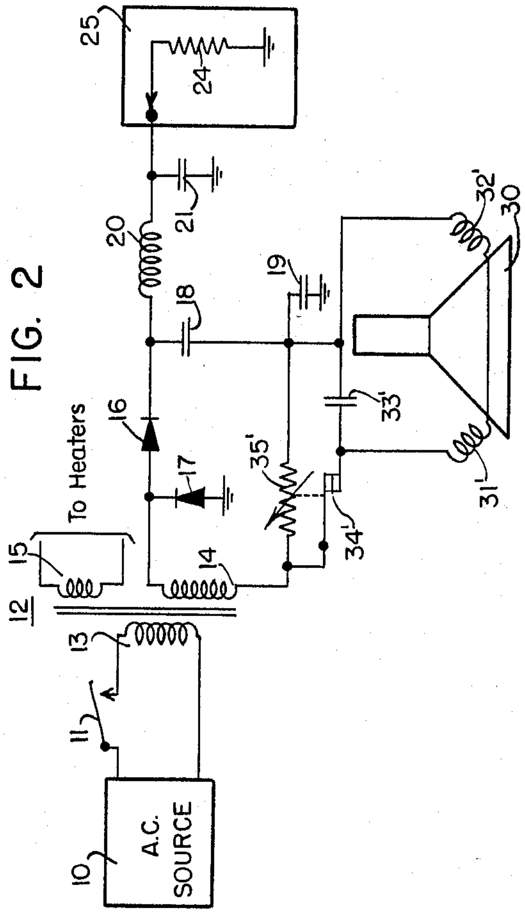

Further objects and features of this invention will be apparent upon reading the specification in conjunction with the drawing in which:

FIG. 1 is a schematic diagram disclosing the system of the invention connected in a partially disclosed color television receiver; and FIG. 2 is a similar diagram showing the circuit of the invention in a different portion of the color television receiver.

Referring now to FIGURE 1, an alternating current source 10 is connectable through a switch 11 to a power transformer 12 in a conventional color television receiver. For purposes of description, it is not necessary to disclose the component parts of the television receiver other than the power supply and the picture tube. Consequently, both FIGS. 1 and 2 should be understood to be partial representations of the schematic diagrams for a color television receiver. Transformer 12 has a primary winding 13, a high voltage secondary winding 14 and a low voltage secondary winding 15. High voltage secondary winding 14 feeds a voltage doubler arrangement comprising a pair of diodes 16 and 17 and a pair of capacitors 18 and 19. This arrangement is well known in the art for developing a direct current voltage approximating twice the peak alternating current voltage amplitude appearing across transformer winding 14 and needs no detailed description. Secondary winding 15 supplies the heaters of the various vacuum tubes (not shown) in the television receiver.

The filter circuit for the direct current developed by the voltage doubler further consists of a choke coil 20 and an additional capacitor 21. It will be readily recognized that other filter elements may be employed and different power supply arrangements may also be utilized with equal facility. A box 25 including a resistance 24 is shown connected to the output of the filter. Resistance 24 represents the load that the television receiver circuitry imposes upon the power supply.

A thermistor 35 is connected in series between switch 11 and transformer primary 13. Thermistor 35 has an inverse temperature-resistance characteristic whereby its cold resistance is high and its hot resistance is low. While the exact characteristics of thermistor 35 will depend upon the specific circuit, in actual practice the cold resistance of thermistor 35 may be about 40 ohms whereas its hot resistance may be on the order of .4 ohm.

A color picture tube 30 is pictorially represented and is shown flanked by a pair of demagnetizing coils 31 and 32. While not specifically shown, picture tube 30 includes a magnetically permeable mask and has a magnetic shield associated with it. The coils are connected in series with a pair of contacts 34 and the whole combination is connected in parallel across thermistor 35. Contacts 34 are thermally actuated and are positioned in heat exchange relationship with thermistor 35. The dashed line joining these elements indicate this operational coaction. Contacts 35 are shown in their normally closed position and are operable by the heat generated from thermistor 35 to disconnect the demagnetizing coils from the junction of A.C. source 10 and thermistor 35. A capacitor 33 is connected across the series combination of demagnetizing coils 31 and 32 for purposes to be detailed below.

In operation, assuming a cold start, the resistance of thermistor 35 is relatively high. Contacts 34 are closed, and, consequently, a substantially low impedance path, including contacts 34 and demagnetizing coils 31 and 32, parallels thermistor 35. In a power supply arrangement similar to the one shown, there is a very high inrush current which primarily is required for charging the filter capacitors. This inrush current may have an initial amplitude on the order of seven times the normal operating current for the receiver. When thermistor 35 is cold, most of the inrush current is directed through demagnetizing coils 31 and 32 where it establishes a strong magnetic field. The inrush current decays very rapidly to a low value, the time required for this decay being on the order of two seconds. At the expiration of this time, very little current is being drawn by the television receiver since its vacuum tube heaters have not been sufficiently heated to emit electrons. Consequently, substantially only the heater current and the "bleeder load" on the filter, both as reflected back to primary winding 13, constitute the current drain from A.C. source 10. During this time, thermistor 35 is warming up and its resistance is decreasing, thereby progressively shunting a smaller proportion of the available current through the demagnetizing coils. For convenience, this shunting is referred to as a tapering action whereby thermistor 35 tapers or shapes the current for demagnetizing coils 31 and 32.

When sufficient time has elapsed (the television receiver is beginning to draw normal currents), thermistor 35 is substantially hot and presents an extremely low resistance to current therethrough. At the same time, the heat generated by thermistor 35 is sufficient to actuate contacts 34 which open and disconnect magnetizing coils 31 and 32. Thus, the net result is that the alternating current through demagnetizing coils 31 and 32 was initially very large and ultimately is extremely small. When controls 34 open, the demagnetizing current, which is at this time extremely small, falls to zero. Thermistor 35 remains hot and prevents contacts 34 from reclosing.

Use of contacts 34 precludes problems which may arise due to the continued presence of the demagnetizing coils in the circuit. Further, this scheme readily lends itself to providing simple mechanical means for disabling the degaussing circuit entirely without losing the advantages of a thermistor in the line circuit for reducing surge current effects on the television receiver.

Consistently excellent demagnetization may be assured by provision of capacitor 33 across the demagnetizing coils. As implied above, upon opening of contacts 34 there may be a slight amount of residual energy in the demagnetizing coils. Capacitor 33 is selected (on the basis of economics) to cyclically dissipate this residual energy and in so doing completes the demagnetization process in an ideal manner. The criteria for selecting capacitor 33 are that it be as large as possible consistent with space and cost limitations. It should be noted that as the capacitor size is increased, the cyclic dissipation rate decreases and the maximum voltage to which the capacitor is subject decreases. Hence, a lower dielectric strength is required. It has been found that a value approximating 0.5 microfarad has proven satisfactory.

In FIGURE 2 a very similar circuit arrangement is shown and like parts are indicated by idential reference characteristics. The basic difference of the circuit of FIG. 2 is that the demagnetizing circuitry is connected to the high voltage secondary winding 14 rather than in the primary circuit. Since the currents in the primary and secondary circuits have different magnitudes, the characteristics of thermistor 35′ should be selected accordingly. Similarly, a pair of demagnetizing coils 31′ and 32′, having a different number of turns to compensate for the reduced current, are utilized and a capacitor 33′ for cyclically dissipating the residual energy therein is connected thereacross. Contacts 34′ are still thermally actuated by the heat generated by thermistor 35′.

The circuit of FIG. 2 has certain advantages over the circuit of FIG. 1, but it also has certain disadvantages and is shown merely for the purpose of disclosing a different circuit embodiment of the invention. The advantage of the circuit of FIG. 2 is that the demagnetizing current, shaped by the tapering action of thermistor 35′ more nearly approaches zero since the current required by the heaters of the vacuum tubes does not flow in secondary winding 14 and hence does not flow in the demagnetizing circuit. Consequently, a smaller minimum current flows through thermistor 35′ and a more ideally tapered current thus flows through demagnetizing coils 31′ and 32′ prior to opening of contacts 34′.

On the other hand, the disadvantage is that the initial amplitude of the inrush current is less than it is in the circuit of FIG. 1, thus requiring more turns in the demagnetizing coils. Aside from these two distinctions, the circuits operate in an identical manner and each is capable of satisfactory demagnetization of the picture tube. On an economic basis, it is preferable to place the demagnetizing circuit in the primary to achieve reduced coil costs.

What has been described is a novel circuit for automatically demagnetizing the color picture tube of a color television receiver during operation. It is recognized that numerous modifications and departures from the invention as described may be made by those skilled in the art without departing from the true spirit and scope thereof as defined in the claims.

The embodiments of the invention in which an exclusive property or privileged is claimed are defined as follows:

1. In combination with a color television receiver having a picture tube including a permeable shadow mask susceptible to external magnetic fields; demagnetizing coil means positioned in demagnetizing relationship adjacent to said picture tube; power supply means including rectifying means connected to a source of A.C. potential; a thermistor having a high-cold resistance and a low-hot resistance serially connected between said source of A.C. potential and said power supply means; a pair of thermally responsive contacts connected in series with said coil means and positioned in thermal relationship with said thermistor; said power supply means, upon connection to said A.C. potential, experiencing an exponentially decaying inrush current characterized by an initially large amplitude; said thermistor increasingly shunting current around said coil means as the temperature of said thermistor rises and opening said pair of thermally responsive contacts to disconnect said coil means when said thermistor is hot; whereby said coil means experience a large amplitude decaying A.C. current for demagnetization of said picture tube; and a capacitor coupled across said coil means for dissipating in a cyclically diminishing manner any residual energy in said coil means.

2. In combination with a color television receiver including a picture tube susceptible to external magnetic fields; a pair of demagnetizing coils positioned in demagnetizing relationship about said picture tube; power supply means including rectifying means connectable to a source of A.C. potential; a thermistor having a high-cold resistance and a low-hot resistance in series with said source of A.C. potential and said power supply; thermally responsive contact means connected in series with said coils and positioned in proximity to said thermistor, said thermally responsive contact means being normally biased to a closed circuit position and assuming an open circuit position responsive to the existence of predetermined temperature conditions; said power supply means, upon connection to said A.C. potential, experiencing an exponentially decaying inrush current characterized by an initially large amplitude; said thermistor progressively shunting current away from said coils as the temperature of said thermistor rises, and said contact means assuming said open circuit position and disconnecting said coils when said predetermined temperature conditions occur, whereby said coils experience a large amplitude decaying A.C. current for demagnetization of said picture tube; and a capacitor coupled across said coils for dissipating in a cyclically diminishing manner any residual energy in said coils.

3. In combination with a color television receiver having a picture tube including a permeable shadow mask susceptible to external magnetic fields; a pair of demagnetizing coils positioned near the face of said picture tube;

power supply means including a rectifier and a capacitor connected to a source of A.C. potential; a thermistor connected in series with said source of A.C. potential and said power supply means; a thermally actuatable switch in series with said coils and being positioned in heat exchanging relationship with said thermistor; said thermistor being electrically in parallel with said switch and said coils and having an inverse temperature-resistance characteristic; said power supply means experiencing a high amplitude exponentially decaying inrush current for charging said capacitor when said television receiver is turned on; said thermistor directing a substantial portion of said inrush current through said coils, by increasingly shunting current away from said coils as the temperature of said thermistor rises and by actuation of said thermally actuatable switch, whereby said coils experience a large amplitude decaying A.C. current for demagnetization of said picture tube and another capacitor connected across said coils for cyclically dissipating any residual energy therein upon actuation of said thermally actuatable switch.

4. In a color television receiver having a picture tube including a shadow mask susceptible to external magnetic fields and a pair of demagnetizing coils mounted adjacent to the picture tube, circuit means for developing a high amplitude, decaying demagnetizing current in said coils comprising; a power supply having a high inrush current characteristic; a thermistor having an inverse-temperature characteristic serially connected between a source of A.C. potential and said power supply; switch means for placing said coils in parallel with said thermistor when said thermistor is below a predetermined temperature range and for disconnecting said coils when said thermistor is above said predetermined temperature range; and a capacitor connected across said coils for cyclically dissipating any residual energy therein upon disconnection of said coils by said switch means, said circuit means cooperating to provide a high amplitude demagnetizing current for said coils.

References Cited by the Examiner

UNITED STATES PATENTS

| | | | |
|---|---|---|---|
| 2,962,622 | 11/1960 | Popovich | 315—8 |
| 3,233,218 | 2/1966 | Borden | 317—141 |
| 3,249,795 | 5/1966 | Dietch | 315—8 |

JAMES W. LAWRENCE, *Primary Examiner.*

R. SEGAL, *Assistant Examiner.*